United States Patent
Miyazaki

(10) Patent No.: US 8,260,116 B2
(45) Date of Patent: Sep. 4, 2012

(54) RECEIVER, PROGRAM RECORDING CONTROLLER, PROGRAM RECORDING CONTROL METHOD AND PROGRAM RECORDING SYSTEM

(75) Inventor: Toru Miyazaki, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1836 days.

(21) Appl. No.: 11/442,293

(22) Filed: May 30, 2006

(65) Prior Publication Data
US 2006/0280440 A1 Dec. 14, 2006

(30) Foreign Application Priority Data
May 31, 2005 (JP) .................................. 2005-160351

(51) Int. Cl.
*H04N 9/80* (2006.01)
(52) U.S. Cl. ........................................................ 386/257
(58) Field of Classification Search .................. 386/231, 386/252–253, 257–259; 380/203
See application file for complete search history.

(56) References Cited

U.S. PATENT DOCUMENTS

| | | | |
|---|---|---|---|
| 6,256,392 B1 * | 7/2001 | Sako et al. ..................... | 380/203 |
| 6,571,220 B1 * | 5/2003 | Ogino et al. ..................... | 705/51 |
| 6,839,503 B1 * | 1/2005 | Hirai .............................. | 386/252 |
| 7,043,645 B2 * | 5/2006 | Kawamae et al. ............. | 713/168 |
| 7,343,012 B2 * | 3/2008 | Kudo et al. ..................... | 380/201 |
| 7,499,462 B2 * | 3/2009 | MacMullan et al. .......... | 370/401 |
| 7,614,076 B2 * | 11/2009 | Ono et al. ..................... | 725/142 |
| 2002/0114462 A1 * | 8/2002 | Kudo et al. .................... | 380/203 |
| 2003/0215210 A1 * | 11/2003 | Yamazaki ...................... | 386/40 |
| 2004/0071443 A1 * | 4/2004 | Kawamae et al. ............. | 386/94 |
| 2005/0228995 A1 * | 10/2005 | Kwak et al. ................... | 713/168 |
| 2007/0009232 A1 * | 1/2007 | Muraki et al. ................. | 386/95 |

FOREIGN PATENT DOCUMENTS

| | | |
|---|---|---|
| JP | 2002-84523 | 3/2002 |
| JP | 2002-344921 | 11/2002 |
| JP | 2003-318874 | 7/2003 |
| JP | 2004-186800 | 7/2004 |
| JP | 2004-240959 | 8/2004 |
| JP | 2004-264894 | 9/2004 |
| KR | 2001-0073905 | * 8/2001 |

OTHER PUBLICATIONS

Kim et al, Machine generated translation of KR 2001-0073905, Aug. 2001.*
Notification of Reasons for Rejection from the Japanese patent office for Application No. 2005-160351, Mailed Apr. 21, 2009, with English language translation thereof, total of 5 pages.

* cited by examiner

*Primary Examiner* — David Harvey
(74) *Attorney, Agent, or Firm* — Finnegan, Henderson, Farabow, Garrett & Dunner, L.L.P.

(57) ABSTRACT

An embodiment of the receiver of the invention includes an output unit to output program data to a recording appliance so as to record a copyright-protected service, a first copyright protective mechanism and a second copyright protective mechanism to protect copyright. The receiver further includes a system manager to detect whether or not a copyright protective mechanism of a recording appliance connected to the output unit is present and switch over between the first and second copyright protective mechanisms in accordance with the detection result to output the program data to the output unit.

1 Claim, 5 Drawing Sheets

```
Activate         ● Enable      ○ Disable

★ Copyright management adopted

Non free program ● a. ○○○ Video HDD-1★
                 ○ b. △△△ PC HDD-1
                 ◉ □□□PC HDD-2

Free             ○ a. ○○○ Video HDD-1★
                 ● b. △△△ PC HDD-1
                 ◉ □□□PC HDD-2
```

FIG. 4

```
Timer recording
    Registration no.              1
    Input source                  ANT1 CH17
    Start time                    7:00pm
    End time                      9:00pm
    Recorder selection (★ Copyright management adopted)

● a. ○○○ Video HDD-1★
            ○ b. △△△ PC HDD-1
            ◉ □□□PC HDD-2
            ○ z. Auto security a.-b
```

FIG. 5

| Saved program list | | | | | |
|---|---|---|---|---|---|
| Title | Source | Start | End | Recorder | Copy restriction |
| 2005 Baseball highlight | ANT1 CH12 | 6:45pm | 9:15pm | b.△△△PC HDD-1 | No |
| Dogs life | ANT1 CH42 | 5:00pm | 6:30pm | a.○○○ Video HDD-1 | Yes |

FIG. 6

RECEIVER, PROGRAM RECORDING CONTROLLER, PROGRAM RECORDING CONTROL METHOD AND PROGRAM RECORDING SYSTEM

CROSS-REFERENCE TO RELATED APPLICATIONS

This application is based upon and claims the benefit of priority from Japanese Patent Application No. 2005-160351, filed May 31, 2005, the entire contents of which are incorporated herein by reference.

BACKGROUND

1. Field

One embodiment of the invention relates to a program recording system for recording a variety of programs, especially, a television (TV) program, on a recording appliance connected to a network; and relates to a receiver, a program recording controller, and a program recording control method for use in the system.

2. Description of the Related Art

In terms of recording of a service program, although a recording method using an analog-type tape used in a system such as the Video Home System (VHS) has mainly prevailed in a conventional manner, the recording method has been changed to a digital system in accordance with the recent development of digital technology.

The recording method in the digital system can suppress to reading zero deterioration in image quality and sound quality caused in recording in an analog system.

Furthermore, it becomes possible for the digital system to record not only a video and a sound but a variety of kinds of data on a one medium and to connect to an unconventional personal computer (PC) appliance.

On the other hand, securing of less deterioration in image quality and sound quality and of convenience in the PC appliance causes to extremely and easily produce an accurate copy to an original image and shows a tendency to produce selling and buying of commercial goods on an illegal distribution route against a program producer's intent.

A law has been world-widely prepared to protect copyright and image right by defining the copyright and image right of the program producer so as to prevent such illegal actions.

The Japanese Patent Application Publication (KOKAI) No. 2002-344921 discloses a content receiver configured to have a function of disabling the recording appliance with no permission to receive a service program.

Digital transmission content protection (DTCP) widely used for IEEE 1394 and HDCP used for digital video interactive (DVI)/HDMI have been available as a technical schema to define the copyright and image right of the program producer to protect the rights. Both of them are defined in their technique and operation standard on the basis of the agreement between a manufacturer to manufacture and sell the recording appliance and a program producer to produce and sell the program.

Accordingly, it is possible for a viewer to achieve a desire thereof intending to record the program and view it at other times while protecting the right of a copyright holder by using a copyright protective technique such as a DTCP and HDCP.

However, these techniques use a method for authentication so as to satisfy conflicting conditions to have appliance compatibility to reproduce the recorded service program even by another appliance and to protect the service program from being copied by a random connection destination. And these techniques are configured to be established only among specified appliances authenticated by a specific third-party organization such as a DTLA.

Although principal copyright protection for a having been presently providing broadcast program is the DTCP and HDCP, the former (DTCP) has been adapted only to IEEE 1394 and the latter (HDCP) has been adapted only to DVI/HDMI.

A DTCP over IP technology to adapt the DTCP, as a program recording pipe for the next generation, to Ethernet cable which is widely used for the PC appliance or the like is now under examination. In recent years, it has been predicted that the recording appliance possible to record the service program will prevail not only for a tape but for a medium such as a hard disk device (HDD) or digital versatile device (DVD). However, in a PC field, these recording appliances have already secured general positions with low prices and the foregoing copyright protective mechanism is not necessarily required for the PC appliance.

Therefore, all of the recording appliances do not necessarily have the copyright protective mechanism in the case that the recording appliances are used in a so-called network connection state such as Ethernet in which a plurality of appliances are connected with a signal cable. And the viewer needs to appropriately utilize the presence or absence of the copyright protective mechanism of the recording appliances on the network.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an exemplary schematic view showing a display example for automatically switching over a recording destination of a "copy-free" service program shown for each input appliance in FIG. 3;

FIG. 5 is an exemplary schematic view showing a display example in timer recording reservation (Timer Recording);

FIG. 6 is an exemplary schematic view showing a display example of a list of programs reserved by the timer recording reservation shown in FIG. 5.

DETAILED DESCRIPTION

Figure 1:
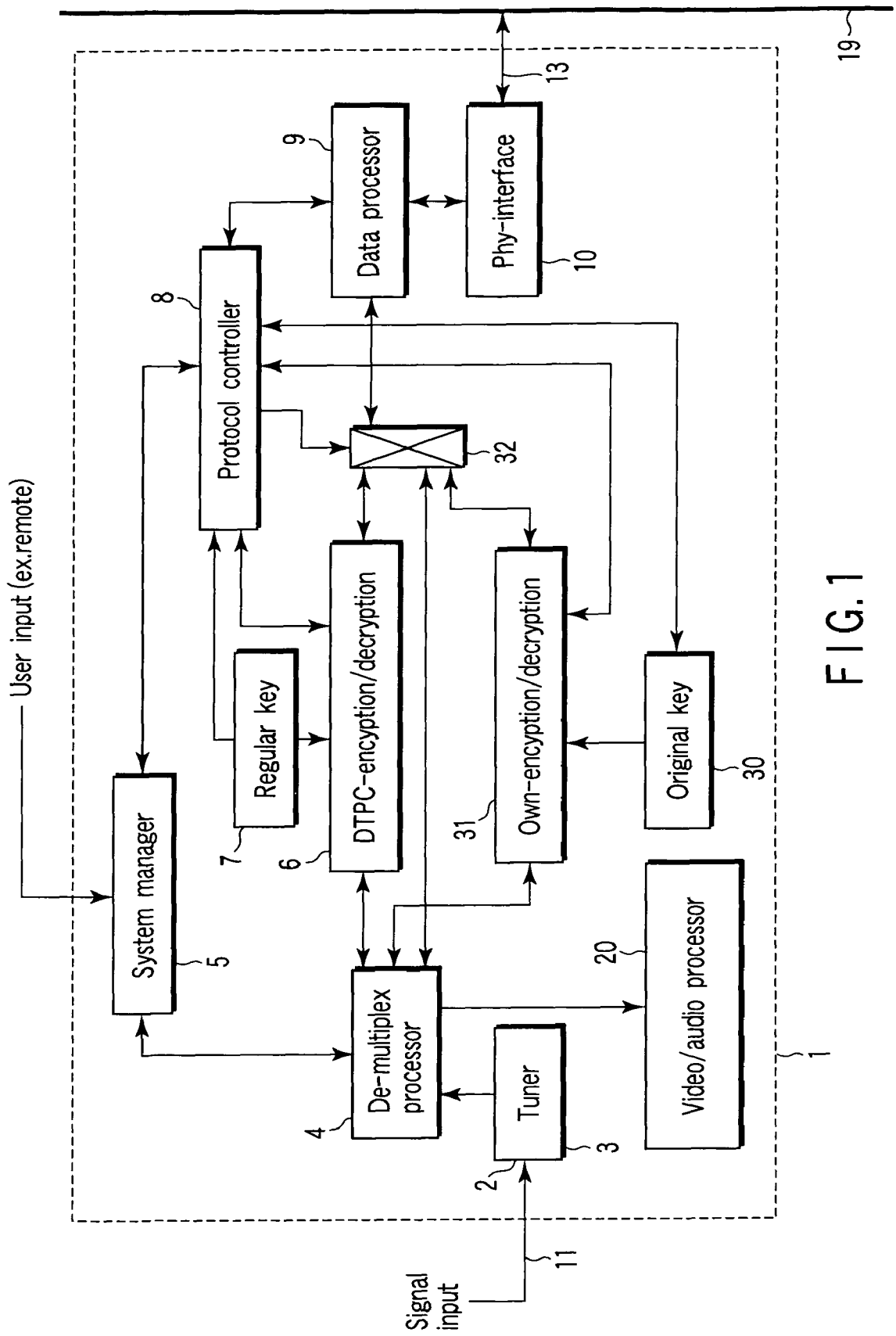
FIG. 1 is an exemplary schematic view showing an example of a connection and a flow of a signal between a program recording/reproducing device (recording appliance) to which an embodiment of the present invention can be applied and a broadcast input appliance (TV receiver) and showing a TV receiver (digital TV) connectable to the recording appliance.

Various embodiments according to the invention will be described hereinafter with reference to the accompanying drawings. In general, according to one embodiment of the invention, a receiver including an output unit to output program data to a recording appliance so as to record a copyright-protected service, a first copyright protective mechanism and a second copyright protective mechanism to protect copyright.

Hereinafter, embodiments of the present invention will be described in detail by referring to the drawings.

Figure 2:
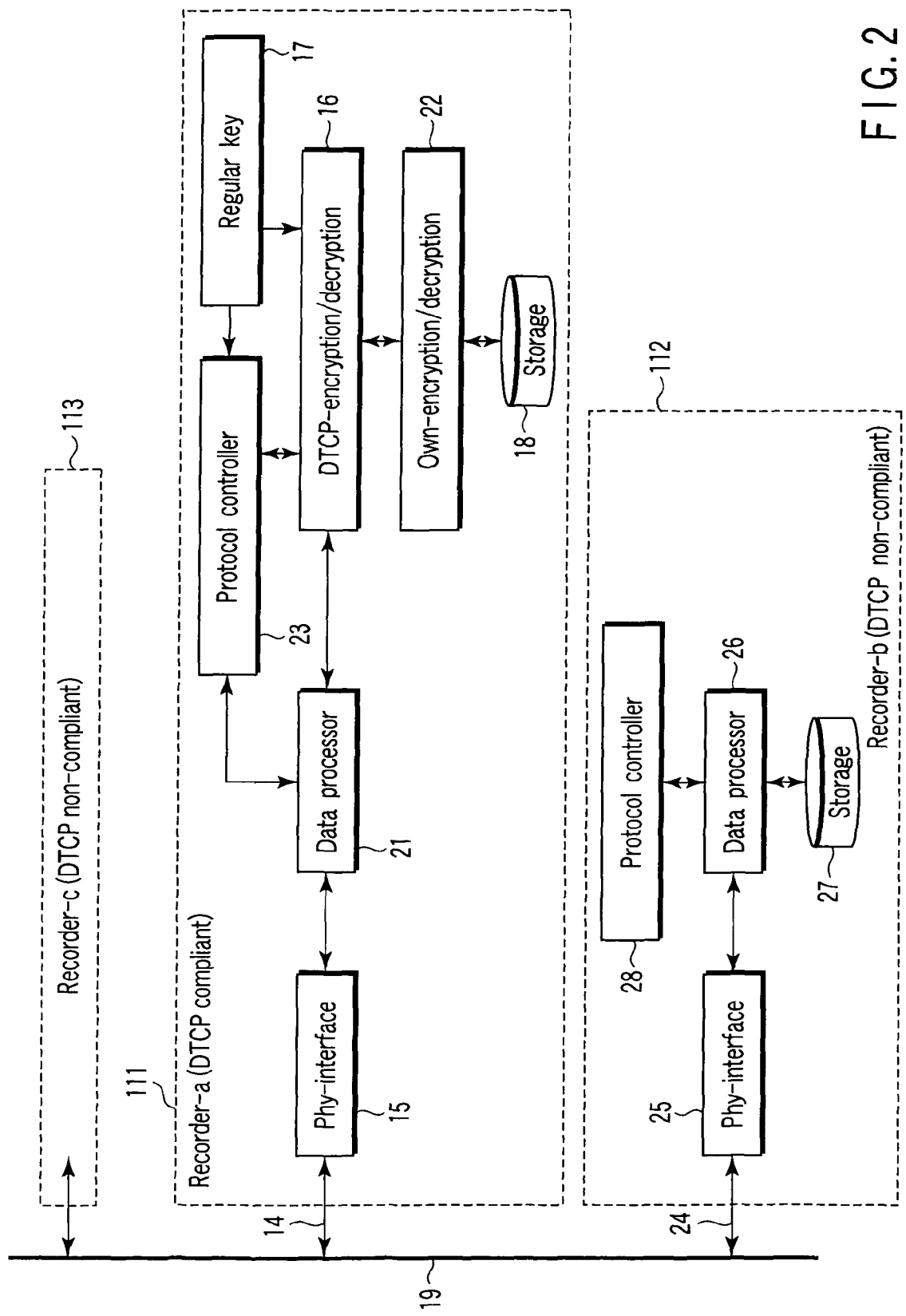
FIG. 2 is an exemplary schematic view showing an example of a connection and a flow of a signal between a program recording/reproducing device (recording appliance) to which an embodiment of the present invention can be applied and a broadcast input appliance (TV receiver) and showing a recording appliance connectable to the TV receiver.

According to an embodiment, FIG. 1 and FIG. 2 each show embodiments of the present invention. FIG. 1 shows a TV receiver (digital TV) connectable to a recorder-a (recording appliance) shown in FIG. 2 by a cable 19. FIG. 2 shows the recorder-a connectable to the TV receiver shown in FIG. 1 by the cable 19. FIG. 1 and FIG. 2 respectively show copyright protective techniques similar to DTCP and show examples using DTCP over IP that is now under technical examination while taking development to a network such as Ethernet represented by a PC into consideration.

As shown in FIG. 1 and FIG. 2, a digital TV 1 and each of a recorder-a (digital recorder) 111, a recorder-b (PC1) 112, a recorder-c (PC2) 113 and a recorder-n (PCn) n is connected with one another by using Ethernet cable 19.

The digital TV 1 capable of receiving a digital broadcast and a digital recording device (recorder-a) 111 capable of recording a program in a digital system have each terminal 13 and 14 built-in, respectively, and these terminals 13 and 14 are connected by the cable 19 with each other.

Ethernet is different from a conventional analog-type video and audio connection, is an interactive communication capable of inquiring from both sides and can deliver video and audio through one and the same line.

The digital TV 1 can input a broadcast signal wave via a terminal (Signal Input) 2. The broadcast signal wave is roughly classified into three kinds, namely, a terrestrial broadcast, a cable broadcast and a satellite broadcast, and any of them is suitable for the broadcast signal wave. Usually, modulation methods are different depending on the kinds of the broadcasts. That is, orthogonal frequency division multiplexing (OFDM) or 8VSB, quadrature amplitude modulation (QAM), and quadrature phase shift keying (QPSK) or 8 phase shift keying (8PSK) are generally used for the terrestrial broadcast, cable broadcast and satellite broadcast, respectively.

A tuner 3 receives these broadcast signal waves to convert them into a signal in a band capable of being used for signal processing from now on and includes a demodulator to extract data transmitted in a digital system.

In ordinary, in the case of a TV broadcast, a digital output from a tuner 3 is output in a data format called a transport stream (TS).

On the TS, control data of as a video, audio and the like is time division-multiplexed. In addition, the video and audio are transmitted in a compressed form for the purpose of decreasing a data amount to be transmitted, respectively.

In the TV broadcasts each using a method for compressing and multiplexing of the data is called MPEGs. A de-multiplex processor 4 executes de-multiplexing work (separation processing) so as to firstly extract a time division-multiplexed vide and audio from the input TS. In this separation processing, arrangement information indicating a utilized.

In the method of separation processing, formats of the data to be actually provided to a viewer through a TV screen (not shown) or a speaker (loudspeaker) may be different from that to be recorded for recording.

In digital broadcast, it is possible to multiplex a plurality of items of video and audio in a stage to multiplex the video and audio on a broadcast side. A frequency band which can be occupied by an electric wave (cable broadcast) has an influence on a data amount (bit rate), and the frequency band can multiplex a plurality of items of video and audio within the range of this frequency band. Most of recent digital broadcasts are operated in the frequency bands by which high-definition television (HDTV) can be transmitted, and about 4-5 channels of standard-definition television (SDTV) can be simultaneously transmitted in the case of transmission of a program of an SDTV class using this electric wave in this frequency band.

A video/audio processor 20 restores the video/audio data which has been compressed and extracted for reproduction through the TV screen and loudspeaker to its original condition and outputs it to a drive circuit of the speaker.

Ordinarily, a viewer decides a program to view or record depending on its request. Although it is not shown, the viewer inputs a prescribed instruction from, for example, a remote controller (remote terminal) to the digital TV 1.

The instruction is transmitted to a system manager 5 grasping and controlling an entire state of the TV receiver (monitor device) through a terminal 12. The system manager 5 has a function to provide information to the de-multiplex processor 4 so as to extract specified video/audio from digital data multiplexed in accordance with the request by the viewer.

The digital TV 1 of this embodiment has a function to record the received program by use of Ethernet having the copyright protection mechanism defined by the DTCP. Hereinafter, the mechanism to record the program will be set forth in the description which follows.

A specific electrical property is specified in a communication through Ethernet. An interactive communication is achieved by giving a signal based on the specification to the cable (Ethernet cable) 19. The electrical property of the communication using Ethernet is different from an electric property used in a circuit in a usual TV receiver, and a physical processor (converter circuit, hereinafter refer to as Phy-interface) 10 has a function to convert the signals in the TV receiver into electric signals prescribed by Ethernet.

The recorder (PC2) 111 to become a connection destination of the TV receiver also has a Phy interface 15 similar to the Phy-interface 10 built-in so as to match the signal from the cable 19 with the electrical property of the inside processing circuit in the TV receiver.

The converted electric signal ordinarily formed in a serial form in digital (serial data). Video/audio and a variety of items of control information is time division-multiplexed on this serial data. That the electric signal is a multiplexed signal in the serial form is similar to the case of the TS; however, its multiplex method is different from the method of the MPEG.

Multiplexer/de-multiplexer (data processor) 9 separates the data to supply it control information to a protocol controller 8 proceeding a communication procedure of the DTCP and supplying video/audio data to an encryption controller (DTCP-encryption/decryption) 6. In addition, Ethernet is an interactive communication system as described above, it is not a one-way system such that receives the broadcast electric wave (cable broadcast). Accordingly, the data processor 9 operates as a de-multiplexer in reception and also operates as a multiplexer in transmission, furthermore, operates to switch over these above-mentioned two operations in an actual operation.

The (DTCP compliant) recorder-a 111 also includes a data processor 21, a protocol controller 23 and an encryption controller (DTCP-encryption/decryption) 16.

The DTCP method manages a coupled (connected) recording appliance enabling to transmit and receive thereto/therefrom by means of a management organization called DTLA and can recognize whether or not the both recording appliances on the transmission side and reception side are those that regularly approved through communication work called authentication.

Confirmation data to recognize the appliances is provided from the DTLA to be delivered manufactures as a part of key data for copyright protection. The key data for the copyright protection is stored in key recorders (regular keys) 7 and 17. Each manufacture may uniquely encrypt the key data to store so as not to be stolen easily or may protect it inside ICs so as not to be externally accessed at all.

Both protocol controllers 8 and 23 perform the above-mentioned authentication work as the first communication steps on the basis of the data stored in both regular keys 7 and 17, respectively. When failing in authentication, the protocol controllers 8 and 23 act so as not to proceed communication steps by at least a part of the operations after the failure. The protocol controllers 8 and 23 act so as not to output a service program, especially, one should be protected on the basis of copyright, even when the service program has been requested to be output.

When both protocol controllers 8 and 23 have completed successfully the authentication work to confirm that the recording appliances are those that have been regularly approved, the transmission side outputs service data such as a video and audio. For example, in the case of recording of the service data, the digital TV 1 outputs the service data, and in the case of reproducing of the recorded program, the recorder-a 111 outputs the service data.

In the output of the service program, it is output in an encrypted form in order to protect it from being copied illegally. Both protocol controllers 8 and 23 appropriately exchange the key information becoming a reference of encryption, based on the reference data stored in the regular keys 7 and 17 to encrypt the program data by means of DTCP encryption/decryption 6 and 16. On reception side, after the forgoing authentication work, the key data for decryption is exchanged with each other and the reception side decrypts the data encrypted on the transmission side by the DTCP encryption/decryption 6 and 16 in accordance with decryption keys.

A tape-type represented by a D (digital)-VHS has prevailed conventionally, as a recording device (storage) 18 to record programs; however, a disk such as an HDD and DVD have been used recently, owing to convenience such as possibility of random access. When actually recording the service program, the digital TV 1 re-encrypts it by a second encryption processor (own-encryption/decryption) 22 so as to also prevent the program from being copied illegally then records it.

The embodiments of the present invention shown in FIG. 1 and FIG. 2 show examples, wherein the DTCP over IP non-compliant recorders (PC1) 112, (PC2) 113 and (PCn) n are connected on the network in addition to the DTCP over IP-compliant recorder-a 111.

The non-compliant recorders (PC1 to PCn) are corresponding to an HDD built in a general PC appliance which has been selling presently in the market and a LAN-type HDD for a PC called NAS.

Each digital TV 1 shown in FIG. 1 and FIG. 2 further includes a change over switch 32, an own-encryption/decryption 31 and a key recorder (original key) 30.

The own-encryption/decryption 31 and original key 30 operates as an encryption device to encrypt data when the digital TV 1 outputs program service data to be recorded, on the other hand, operates as an decryption device when the digital TV 1 receives the program service data to reproduce it.

In a DTCP compliant method, when a certain digital TV record the service program in a DTCP compliant recording appliances the recorded program can be reproduced not only by this digital TV but any product compliant with the DTCP.

In the processing though the own-encryption/decryption 31; however, there is a different point in that an encryption method is not disclosed toward external appliance or organization and only the digital TV itself, which has output the service program data for a recording output, cannot reproduce it. Such a method is called "chained (mechanically chained)" and a "under examination" method expecting to be authorized by a part of broadcast media.

In the case of use of the own-encryption/decryption 31, it is not necessarily needed to be a recording appliance having a public copyright protective mechanism and a general Ethernet-type HDD is usable.

Examples shown in FIG. 1 and FIG. 2, each show states, in which the first PC1 112 or second PC2 113 is connected or external appliance (HDDn) PCn n is externally connected, as a copyright protective mechanism-incompatible recording appliance. These recording appliances, namely, the first PC1 112, the second PC2 113 and the external appliance (HDDn) PCn n are not provided with the encryption controller (DTCP encryption/decryption) 16 and the second encryption controller (own-encryption/decryption) 22 differing from the case of the DTCP compliant recorder-a 111.

As mentioned herein, a coupled (connected) recording appliance itself who can record the program in a method based on the DTCP standard by using the DTCP encryption/decryption 6 has to need the coupled (connected) recording appliance has the DTCP compliant copyright protective mechanism. On the other hand, in the case of use of the own-encryption/decryption 31, if a recording destination does not have the copyright protective mechanism, there is no possibility that the recording itself is restricted perfectly even though the recording is conducted in the method called "Chained".

The digital TV 1 can determine whether or not the coupled (connected) recording appliance (recording destination) has the copyright protective mechanism by the authentication work in a coupled (connected) recording appliance. That is, if the authentication work is resulted in a failure, the digital TV 1 determines that the recording appliance is not compatible with the copyright protective mechanism.

The protocol controller 8 switches over an appropriate selection between the DTCP encryption/decryption 6 and the own-encryption/decryption 31 in accordance with such the presence or absence of the copyright protective mechanism at the recording destination.

The layers of the copyright protection roughly include three stages: "copy free (non-encryption)", "copy once (copy is available only once)" and "copy never (recording/reproducing impossible)".

The digital TV 1 does not encrypt the service program with particular and allows the user to record and reproduce freely. The program which has been recorded in a state of non-encryption is possible to be used for a variety of kinds of editing as well as to be reproduced and to be produced a variety of reuse values for the viewer.

In the case of recording under this non-encryption condition, the program data inputs the data processor 9 are directly outputs from the de-multiplex processor 4. Since the changeover switch 32 changes by instruction from the protocol controller 8 and bypasses the encryption processing (DTCP encryption/decryption) 6.

As described herein, the embodiment of the present invention can correspond to three kinds of methods in accordance with recording forms after recording, wherein the methods are:

a first method for recording the service program data in a method compliant with a (conventionally) prescribed copyright protective mechanism such as the DTCP and enabling the service program data to be reproduced by another appliance compliant with this method; a second method for restricting the appliance capable of reproducing the program data to an appliance which has output the program data; and a third method for restricting the program data to the "copy free" program but recording the program data as it is without protecting its copyright absolutely.

These methods have to appropriately process the program data on the basis of the presence or absence of the copyright protective mechanism in the recording destination appliance, and have to use recording and reproducing functions after appropriately informing the information about the copyright protective mechanism to the viewer. That is, when using any method with erroneous recognition, the user will have a possibility not to view the program by means of the digital TV 1 (specified by the user) by which the user wants to reproduce it.

Figure 3:
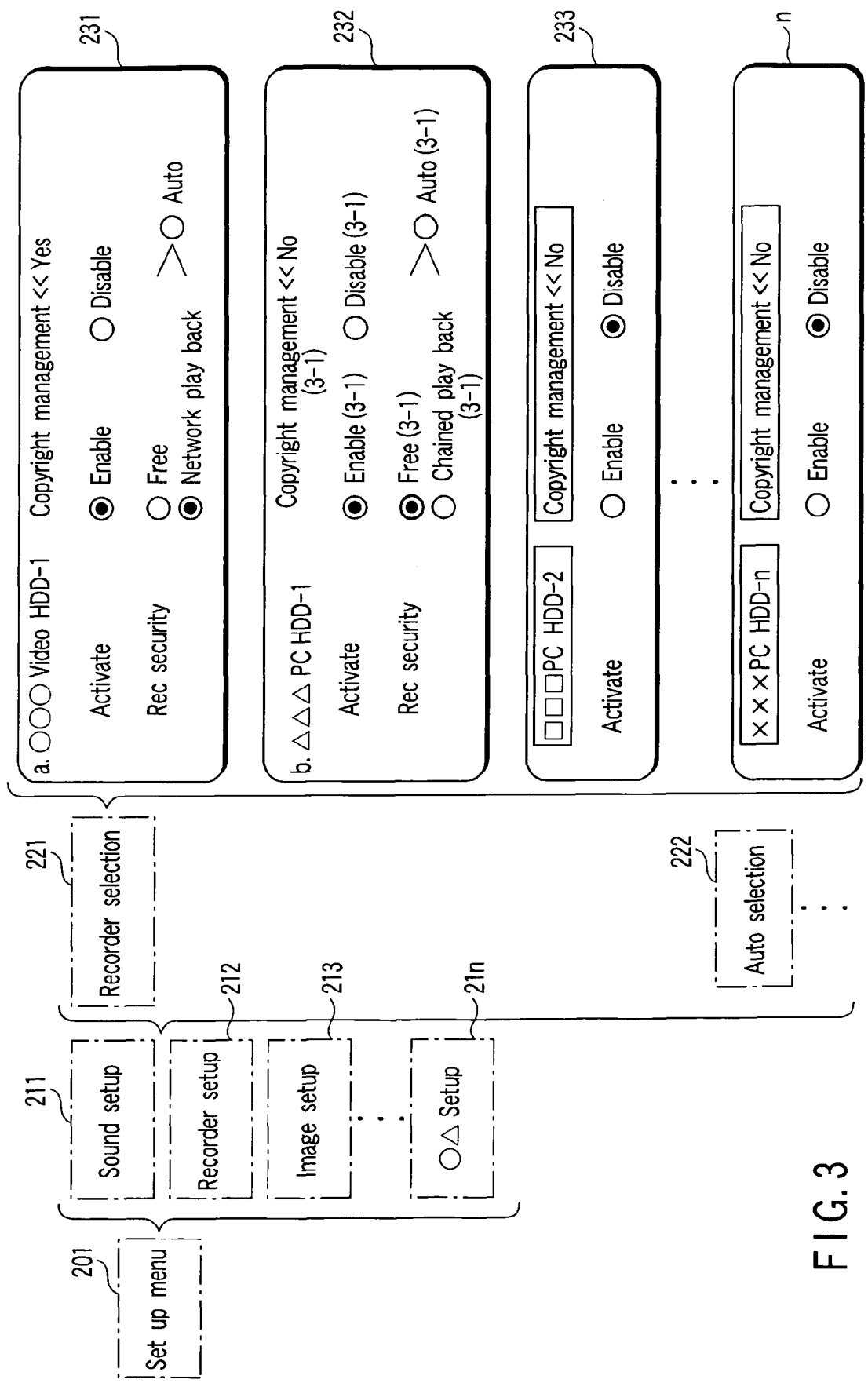
FIG. 3 is an exemplary schematic view showing an example of a user setting screen to be displayed on a TV receiver (or monitor device) in accordance with the connection between the recording appliance and the broadcast input appliance (TV receiver) shown in FIG. 1 and FIG. 2, respectively.

FIG. 3 shows the example of the user setting screen to set the three kinds of recording methods (copyright protection) on the basis of the use form after recording. As for an example of a screen display, from, for example, "menu screen" (not shown), the user's selection of a display 201 of "Set Up Menu" by, for example, an operation of a remote controller terminal displays a "screen" displaying a prescribed set up menu, for example, "Sound Setup" 211, "Recorder Setup" 212, "Image Setup" 213 and the like. In FIG. 3 and each drawing which will be described below, it is obvious that display examples described as "display" may be, for example, a widely used "icon" or "button", is displayed areas may be inversed when a control signal is input and selected by a user's operation of a remote controller (not shown), and the "display" itself may be varied or deformed.

For example, if the user selects "Set up Menu" by operating the remote terminal, a "screen" displaying a prescribed setup menu, for example, "Sound Setup" 212, "Recorder Setup" 212, "Image Setup" 213 or the like is displayed.

When the user operates the remote terminal to select, for example, "Recorder Setup", a "screen" displaying the "Recorder Selection" 221 and "Auto Selection" 222 is displayed.

Hereinafter, examples of a "screen (image)" displayed on a TV receiver (monitor device) will be shown by referring the case of selection of "Recorder Selection" 221 as an example.

By selecting the "Recorder Selection" 221, the TV receiver (monitor device) displays an arbitrary number of recording appliances connected to the digital TV 1 via Ethernet cable 19, namely, the first recorder (PC1) 112, the second recorder (PC2) 113 and the recorder (PCn) n in addition to recorder-a 111, with prescribed sizes (display sizes). If there is a recording appliance which cannot be displayed on a single "screen", it is not displayed at a prescribe position. However, although not shown in a drawing, "scroll bar" display to prompt a scroll and "↑(upward arrow symbol)" display and "↓(downward arrow symbol)" display to suggest scroll directions, or "lateral scroll bar", "→(leftward arrow symbol)" display, and "←(rightward arrow symbol)" display to suggest scroll directions, or the like. And it is no doubt that the user can select any display among these displays.

In FIG. 3, the "display" 231 corresponds to the recorder-a 111 and includes "displays", for example, "(manufacturer name)○○○ Video HDD 1 display" indicating a model name, "Copyright Management <<Yes display" indicating whether compatible with copyright protective is installed or not, and the like. These "displays" are automatically obtained in the authentication work for the above-mentioned the coupled (connected) recording (connection destination) appliance in accordance with a preset protocol.

The "display" 231 also displays, for example, an "activate column display" indicating whether or not in an active state, "enable column display" and "disable column display" that are states of the "activate column display", "Rec. Security column display" and "Free (non-restriction) column display" indicating the states of the recorder-a 111, "Network Play Back (approval only within network) column display" or "Security Network Play Back (reproducible by other appliances if they are encryption-compliant appliances) column display" and "Auto (automatic switching) column display", and the like. In a plurality of "displays", being specified in selectable, any "display" is selected then, for example, by a 'double-circle ◎' symbol, a current state (selection result) is displayed for the user. "Rec. Security" will be described in detail later by referring to FIG. 4. In terms of the "Rec. Security" displayed at the "Rec. Security column display", it is allowed some recording methods ["Network Play back" (approved only within network)] in which copying is restricted to change into the state of ["Chained (mechanically chained) Play Back" (only approved)] or ["cancel" (no recording)] (low order restriction).

Hereinafter, in the same way, the "display" 232 corresponds to the recorder (PC1) 112 and displays "displays" such as a "(manufacture name)△△△ PC HDD 1 display", and "Copyright Management<<No display", whether or the copyright protective compatibility presence or absence, and or the like.

In this "display" 232, the copyright (Copyright Management) column indicates "No", so that the "display" 232 displays "Rec. Security column display", "Free (no restriction) column display" and "Chained (mechanical chained) Play Back" (only approved) column display".

Similarly, the "display" 233 corresponds to the recorder (PC2) 113 then, for example, the "displays" of model name "(manufacture name)□□□ PC HDD 2 display", the presence or absence of copyright protection compatibility "Copyright Management (copyright)<<No display", or the like are displayed.

In this "display" 232, the copyright (Copyright Management) column indicates "No", so that the "display" 232 displays "Rec. Security column display", "Free (no restriction) column display" and "Chained (mechanical chained) Play Back" (only approved) column display".

Similarly, in "display" n, according to the recorder (PCn) n, for example, "displays" of model name "(manufacturer name) X X X PC HDD n display", presence or absence of copyright protective mechanism "Copyright Management<<No display", and the like are displayed.

Like this description, having described by referring to FIG. 3 with reference to "displays" as examples displayed on a screen (monitor) (not shown) of the TV receiver 1 about the presence or absence of the copyright protection compatibility "Copyright management" and the change to the lower order compatibility of "some recording methods in which copying are restrained" in "Rec. Security" based on the copyright management condition, the important point is to present that "How is the copyright protective mechanism of the recording appliance? or "What selection means is installed in the recording appliance?" for the selection of the recording destination by the viewer (user).

The embodiment in FIG. 3 shows the presence or absence of the installation of the copyright protective mechanism by the screen (display example) to set the recording appliance at the recording destination. That is to say, the "Copyright Management<<Yes display" indicates the installation of the copyright protective mechanism and the "Copyright Management<<No display" indicates non-installation thereof.

As mentioned above, another reproducing appliance cannot reproduce the service program recorded in the copyright protective mechanism-uninstalled appliance. In this case, unless the service program is at least in the condition under "Copy Free (Copyright Free)", the recording appliance must record the service program in a state in which the service program is encrypted by the own-encryption/decryption 31 and remained unchanged.

As long as the service program is in the state of "Copy Free", the recording appliance may record it as it is.

In FIG. 3, for example, the recorder (PC1) 112 indicated in the "display" 232 is an example of the setting screen of the recording appliance under the condition of the aforementioned "Copy Free". So that, FIG. 3 shows the example such that the recorder (PC1) 112 can select an option among the following choices: constant use of the encryption/decryption 31 ("mechanically chained" state); constant recording with "Non-encryption"; or automatic selection in the condition of only under the condition of "Copy Free", on the basis of the copyright information of the service program to be recorded.

As given description, among the recorder-a 111, recorder PC1 112, recorder PC2 113 and HDD n shown by the "displays" 232, 232, 233 and n in FIG. 3, respectively, the DTCP encryption/decryption 6 is available for the recorder-a 111 with the copyright protective mechanism. The "Copy Free" program may be recorded in a non-encryption state. And it goes without saying that the "Copy Free" program may be approved to be recorded by any recording appliance regardless of the presence or absence of the copyright protective mechanism.

FIG. 4 shows an example of automatic switching of the recording destination for the "Copy Free" service program shown in FIG. 3, and further shows an example, in which "recording destination setting (switching) display" is displayed from a "menu screen" (not shown) in accordance with the instruction by the user through the operation of the remote controller (remote) terminal.

The example shown in FIG. 4 includes "displays" such as an "activate column display", and for its state displays: an "Enable column display" and a "Disable column display", a presence or absence of copyright protective compatibility "Copyright management adapted (copyright standby), e.g. indicated with addition of 'star mark☆')" display.

The "Copyright Management adapted display" includes such a "display" of "Non Free Program (recordable only by approved appliance) display", and the user is informed the fact that, for example, among a plurality of recording appliances connected to the digital TV 1 the action of "Copyright" is allowed to the recorder-a 111 and also the copyright-protected program is assigned thereto to be recorded, by additionally indicating the '☆' to the recorder-a 111 with "Yes (approval)" in "Copyright management".

On the other hand, in the example shown in FIG. 4, the user comes to know the fact that the recording of the copyright-unprotected ("Copy Free") program is assigned to the recorder (PC1) 112, by the "Free Program display".

In FIG. 4, the user is notified the fact that even the recording of the copyright-unprotected ("Copy Free") program is not assigned to the recorder (PC2) 113, by a display method such as a "High-light Gray Down display".

FIG. 5 shows the display example when the timer recording reservation (timer recording) is made.

As mentioned above, it is effective for the user to enable selecting the timer reservation at the time of the reservation on the basis of the purpose for the use of the recorded service program at a future date, because if the user has selected the recording appliance due to the erroneous notification, there is a possibility that the user will not be able to view the program by the digital TV 1 (specified by the user) used for the reproduce of the recorded program. The example in FIG. 5 indicates for the user the recording appliance equipped with the copyright protective mechanism by adding a 'double-circle ◉'. The "Auto Security display" means, as shown in FIG. 4, an option to automatically switching over the recording destination in accordance with a copyright protective flag of the service program to be recorded.

The "display" examples shown in FIG. 5 shows, in the display for the timer recording reservation, continued from the "Timer Recording (recording reservation) display", for example, the following are displayed: number "n" corresponding to "Registration No. display"; "Channel name (supplying method)" corresponding to "Input Source display", "time and minute (HH:MM, HH indicates time, MM indicates minute, respectively)" corresponding to "Start Time (start time) display", "time and minute (HH:MM, HH indicates time, MM indicates minute, respectively)" corresponding to "End Time (termination time) display", "model name (including presence of absence of Copyright management) corresponding to "Recorder Selection (selected recording appliance) display", and the like. By the "displays" shown in FIG. 5, the user comes to know the fact that "Copyright Management adapted display" has been available and the recorder-a 111 has been selected as the recording appliance, based on the indication of the 'double-circle ◉' mark.

FIG. 6 shows the display example of the list of the saved programs with the timer recording reservation (Timer Recording) has been already made therefore.

As mentioned above, if the user uses any recording appliance on the basis of the erroneous recognition, since there is the possibility for the user to be brought into impossibility of viewing of a program on the digital TV 1 (specified by the user) to reproduce the program thereby, it is needed for the user to specify the recording destination in accordance with how the user will want to use the recorded service program in a future data even when the user has made the timer recording reservation.

The example in FIG. 6 shows the list indicating in contradistinction between the program to be recorded and "Copy Restriction (copy level)".

In the example of "displays" shown in FIG. 6, continued to "Saved Program List (list) display", for example, "Title (program name) display", "Source (input) display", "Start (start time) display", "End (termination time) display", "recorder (recording destination appliance name) display" and "Copy Restriction" of the program are displayed. It is displayed that, for example, since the program with the name of "2005 Baseball highlight" is a "Copy Free" program, this program will be recorded on the HDD of the PC made by ΔΔΔ company and the program titled "Dogs Life" will be recorded on the recorder-a 111 made by ○○○ company under the "Copyright Management".

Figure 7:
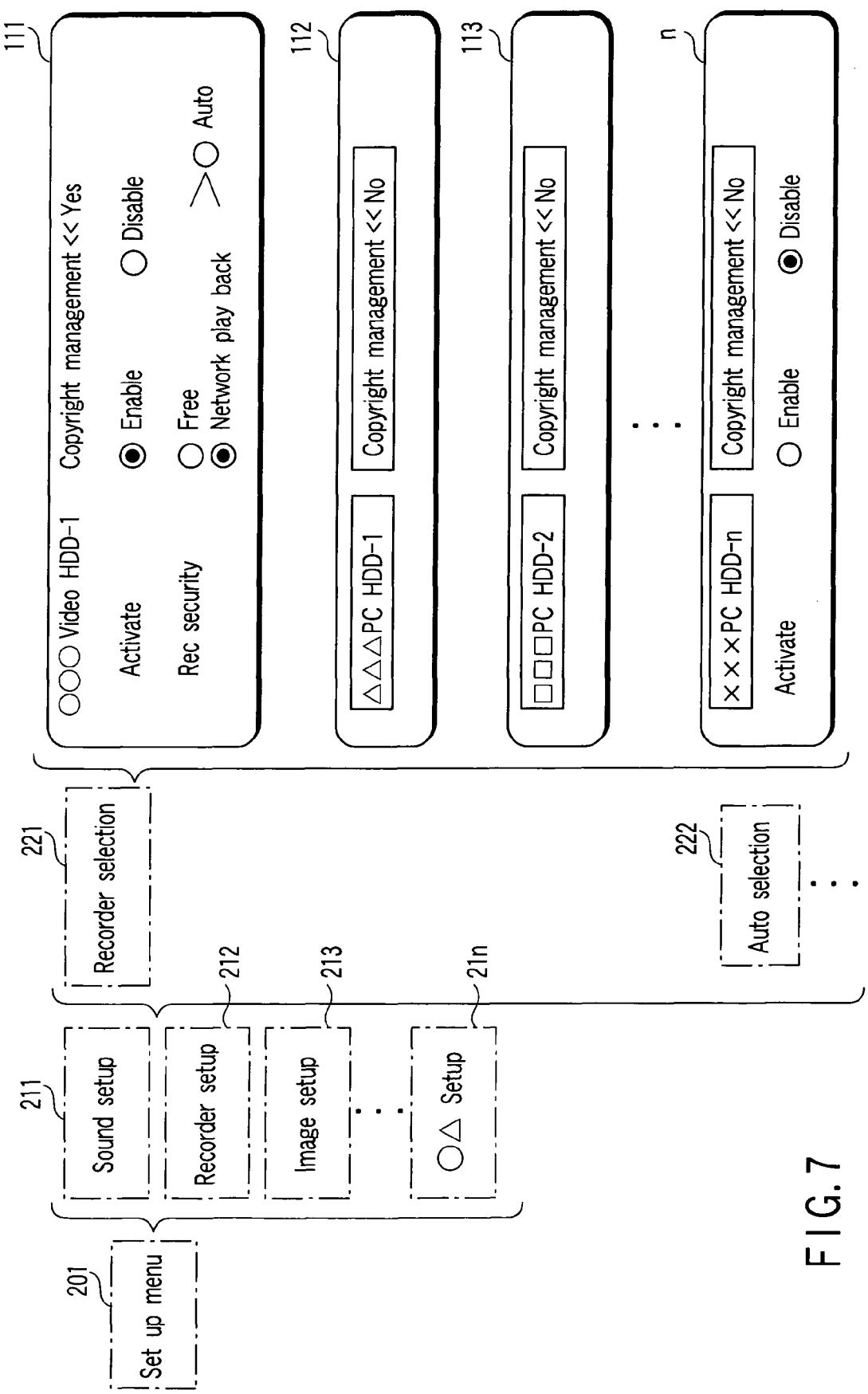
FIG. 7 is an exemplary schematic view showing another screen example of the user setting screen above-described by referring to FIG. 3.

FIG. 7 shows another screen example of the user setting screen above described by referring to FIG. 3. This example is one in the case that any recording appliance with no copyright protective mechanism is not allowed to record program data.

That is, the "screen" shown in FIG. 7 shows an example, wherein the user easily distinguishes whether or not a recording appliance is equipped with the copyright protective mechanism, by using a method of a "High-light gray down" display or of no menu display in "lower layer", for the recording appliance with no copyright protective mechanism.

As being obvious from FIG. 7, as compared to the example shown in FIG. 3, in terms of the recording appliance other than the recorder-a 111 corresponding to "Copyright Management (copyright protection)", displays other than the model name "(manufacturer name), PC1 HDD 1 display", etc. are omitted in their display and it is informed for the user that the recording-approved recording appliance is only the recorder-a 111 (refer to FIG. 1 and FIG. 2), so that the user can easily recognize that the copyright protection-compliant program is allowed to be recorded only by the recorder-a 111.

It is certainly obvious that the example in FIG. 7 may be changeable into an example of a method for displaying only a list of appliances respectively quipped with the copyright protective mechanisms.

Having shown the DTCP Encryption/decryption 6 and its accompanying regular key 7, the own-encryption/decryption 31 and its accompanying original key 30 are shown by separated block structures, the same circuit may be used in terms of a circuit structure. It is also obvious that not limited to the DTCP compliance, any protective mechanism is available as long as in a manner in which a plurality of appliances can be simultaneously connected by a single connection.

Needless to say, these embodiments of the present invention can achieve the management to make even other type of the digital TV 1 impossible to view the service programs by managing information by means of each digital TV used by key recorders (regular key 7, etc.).

Moreover, there is no doubt that the embodiments can achieve even the protocol controller 8 and the system manager 5 by using a CPU which is the same one in terms of circuit by processing the protocol controller 8 and the system manager 5 through a software.

As mentioned above, if an existing recording appliance, especially, a PC appliance or the like is placed on a network, the embodiments of the present invention can achieve an effective program recording mechanism (copyright protection) including the recording appliance.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A receiver comprising:
an output terminal to output program data to a recording appliance in order to record a copyright-protected service;
a controller;
the controller configured to restrict capability of reproducing data to an appliance which has output the data by controlling first program data;
the controller configured to authenticate an appliance capable of reproducing the data with an appliance which has output the data to protect copyright by controlling second program data;
the controller configured to determine an installation state of copyright protection of the recording appliance connected to the output terminal; and
a switch configured to output the first program data to the output terminal when the controller determines that the recording appliance has no copyright protection and output the second program data to the output terminal when the controller determines that the recording appliance has the copyright protection.

* * * * *